United States Patent [19]

Haas et al.

[11] Patent Number: 4,761,307

[45] Date of Patent: Aug. 2, 1988

[54] PROCESS FOR THE PRODUCTION OF OPTIONALLY FOAMED POLYURETHANES WHICH ARE COMBINED OR FABRICATED WITH ANOTHER MATERIAL

[75] Inventors: Peter Haas, Haan, Fed. Rep. of Germany; Hans-Albrecht Freitag, Pittsburgh, Pa.; Geza Avar, Leverkusen, Fed. Rep. of Germany

[73] Assignee: Bayer Aktiengesellschaft, Bayerwerk, Fed. Rep. of Germany

[21] Appl. No.: 817,222

[22] Filed: Jan. 8, 1986

[30] Foreign Application Priority Data

Jan. 23, 1985 [DE] Fed. Rep. of Germany ....... 3502107

[51] Int. Cl.$^4$ .................. B05D 5/00; B05D 3/02; B32B 5/18
[52] U.S. Cl. ..................... 427/243; 156/77; 156/78; 156/79; 264/45.5; 264/45.6; 427/244; 427/245; 427/247; 427/385.5; 427/389; 427/392; 427/393.5
[58] Field of Search ............ 427/385.5, 389, 392, 427/247, 393.5, 243, 244, 245; 264/45.5, 45.6; 521/117; 528/53; 156/77, 78, 79

[56] References Cited

U.S. PATENT DOCUMENTS

| | | | |
|---|---|---|---|
| 3,091,551 | 5/1963 | Robertson | 427/247 X |
| 3,503,934 | 3/1970 | Chilvers | 427/393.5 X |
| 3,622,542 | 11/1971 | Klouman et al. | 260/77.5 |
| 3,725,120 | 4/1973 | Suter | 427/247 X |
| 3,954,749 | 5/1976 | Priest et al. | 521/129 |
| 4,049,931 | 9/1977 | Sandner et al. | 544/168 |
| 4,081,578 | 3/1978 | Van Essen et al. | 427/393.5 X |
| 4,510,269 | 4/1985 | Kopp et al. | 521/166 |

Primary Examiner—Thurman K. Page
Attorney, Agent, or Firm—Gene Harsh; Joseph C. Gil; Lyndanne M. Whalen

[57] ABSTRACT

The present invention is directed to a process for the production of optionally foamed polyurethanes which are combined or fabricated with another material, comprising reacting compounds with molecular weights from 400 to 10,000 containing at least 2 isocyanate reactive hydrogen atoms with polyisocyanates in the presence of catalysts containing tertiary amino groups and combining or fabricating the resulting polyurethane with another material, characterized in that the catalysts used are diffusion resistant aminoalkanols corresponding to the general formula

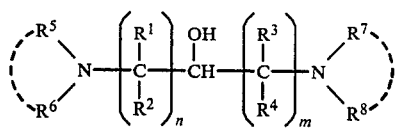

wherein
$R^1$, $R^2$, $R^3$ and $R^4$ may be identical or different and represent hydrogen or a $C_1$–$C_6$ alkyl group,
$R^5$, $R^6$, $R^7$ and $R^8$ may be identical or different and represent a $C_1$–$C_6$ alkyl group or together form a $C_2$–$C_6$ alkylene group which may contain hetero atoms such as O or NR (R=$C_1$–$C_4$ alkyl), and n and m may be identical or different and represent integers from 1 to 6.

6 Claims, No Drawings

PROCESS FOR THE PRODUCTION OF OPTIONALLY FOAMED POLYURETHANES WHICH ARE COMBINED OR FABRICATED WITH ANOTHER MATERIAL

BACKGROUND OF THE INVENTION

The production of polyurethanes with the aid of various kinds of catalysts is known. When polyurethane composite materials and fabricated polyurethane products are produced, for example, from polyurethane foams and covering materials such as colored polyvinyl chloride or ABS foils or textile covering layers of cotton or leather, it has frequently been found that the catalysts damage the covering materials due to diffusion.

In back foamed foils based on PVC and ABS, marked color changes occur in the covering and sheathing materials due to separation of the activators so that even foils which are originally light in color become very dark or even black.

U.S. Pat. No. 3,622,542 describes the use of N,N'-tetramethyl-2-hydroxy-1,3-diamino-propane as a catalyst for the production of polyurethane foams.

The function of the present invention is to discover catalysts which
1. show no tendency to produce diffusion effects and therefore prevent
2. direct contact discoloration in covering materials as well as
3. indirect changes in color and constitution of adjacent materials due to separation of catalyst, even when polyurethane composite materials and fabricated polyurethane products are subjected to heat.

This problem is solved by means of the catalysts used according to the invention.

DESCRIPTION OF THE INVENTION

The invention is directed to a process for the production of polyurethanes (which may be foamed) which are combined or fabricated with another material, comprising reacting compounds with molecular weights of 400 to 10,000 containing at least two isocyanate reactive hydrogen atoms with polyisocyanates in the presence of catalysts containing tertiary amino groups and optionally in the presence of chain lengthening agents with molecular weights of from 32 to 399, foam stabilizers, water and/or organic blowing agents and optionally other auxiliary agents and additives, and combining or fabricating the resulting polyurethane with another material, characterized in that the catalysts used are diamino-alkanols corresponding to the general formula

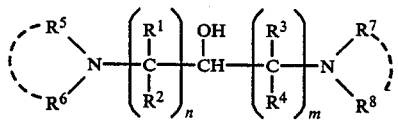

wherein
$R^1$, $R^2$, $R^3$ and $R^4$ may be identical or different and represent hydrogen or a $C_1$-$C_6$-alkyl group,
$R^5$, $R^6$, $R^7$ and $R^8$ may be identical or different and represent a $C_1$-$C_6$ alkyl group or may combine to form a $C_2$-$C_6$ alkylene group which may contain hetero atoms such as O or NR (R=$C_1$-$C_4$ alkyl), and
n and m may be identical or different and represent integers from 1 to 6.

The materials used in the fabrication are preferably PVC; ABS; mixtures of PVC and ABS; polyvinyl acetate; polyvinyl butyral; copolymers and homopolymers of vinyl chloride, styrene, butadiene, isoprene, chloroprene, dichlorobutadiene, ethylene, propene or acrylonitrile and their chlorination and chlorosulphonation derivatives; in the form of foils, coverings and edgings, (optionally with differing color) tones, or textiles based on cotton or leather.

The symbols used in the above mentioned general formula preferably have the following meanings:

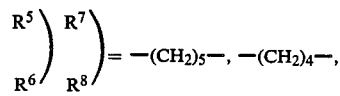

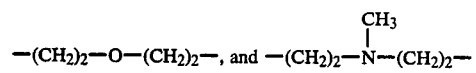

$$-(CH_2)_2-O-(CH_2)_2-, \text{ and } -(CH_2)_2-\underset{\underset{CH_3}{|}}{N}-(CH_2)_2-$$

n and m=1 or 6.

Compounds corresponding to the following formula

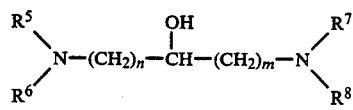

($R^5$, $R^6$, $R^7$ and $R^8$=methyl or ethyl) n, m=1 n, m=6 and compounds corresponding to the formulae

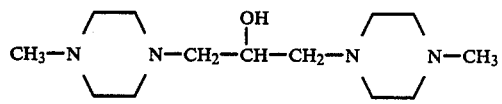

and

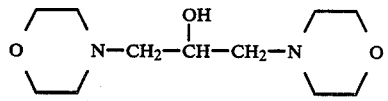

are preferred catalysts for the purpose of this invention.

A representative of the tetraalkyl-bisaminoalkanols to be used according to the invention is already known as a catalyst for the preparation of polyurethanes (see U.S. Pat. No. 3,622,542). It is surprising however, that the diaminoalkanols to be used according to the invention prevent contact discoloration at the interface between the polyurethane and, for example, a covering material such as PVC, ABS or textiles or leather.

The aminoalkanols to be used according to the invention are transparent liquids with a slight characteristic odor which, however, is not noticed even when the foams are still hot and freshly removed from a heated mold. The aminoalkanols are generally used in a quantity of from 0.1 to 10 parts by weight, preferably from 0.5 to 5 parts by weight, the quantity being based on 100 parts by weight of the compounds with molecular weights of from 400 to 10,000 which have at least 2 isocyanate reactive hydrogen atoms.

The following formulae represent specific examples of compounds to be used according to the invention:

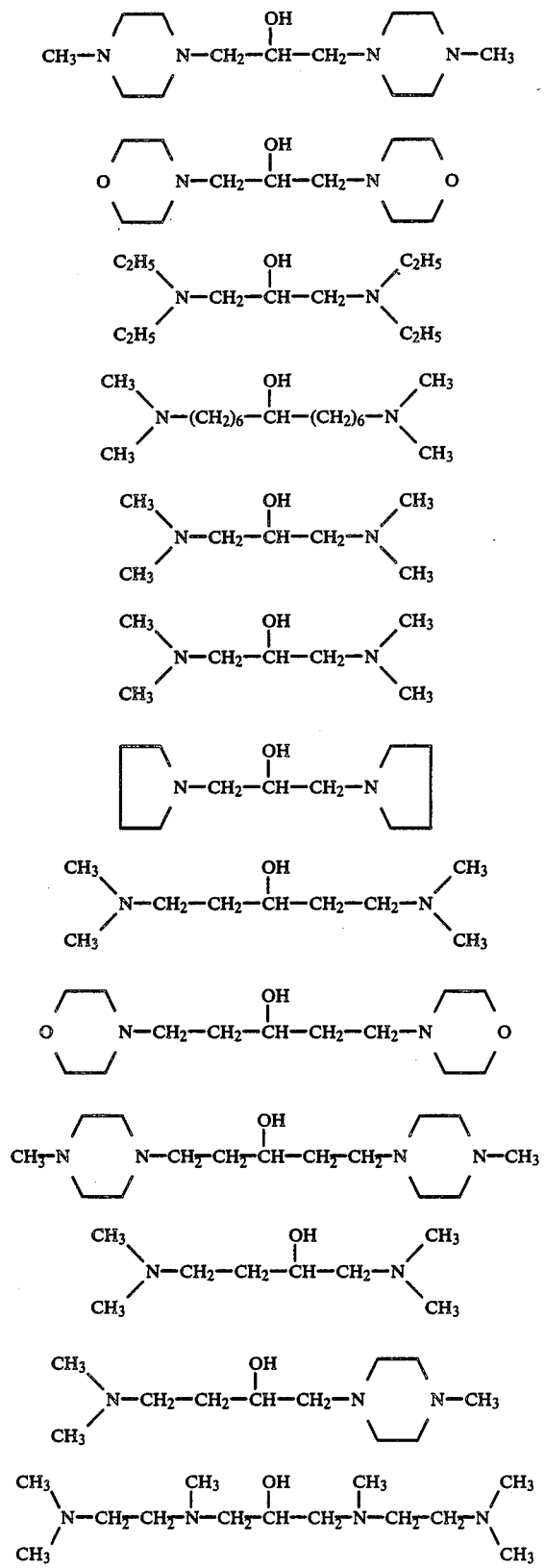

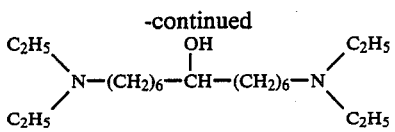

The preferred catalysts used according to the invention are obtained by a step-wise reaction of epichlorohydrin with the corresponding amines or amine mixtures.

The following are examples of amines used as starting materials for the synthesis of the aminoalkanols used according to the invention:

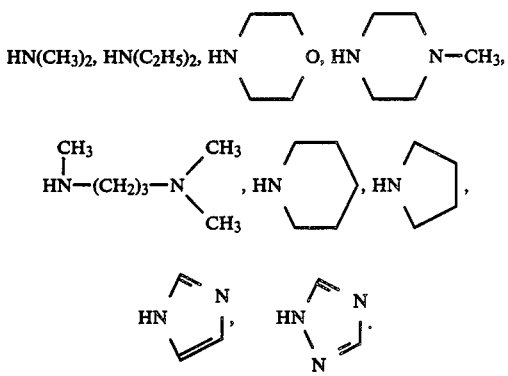

The following substances are used according to the invention for the preparation of the polyurethanes:

1. Substantially any polyisocyanate may be used including aliphatic, cycloaliphatic, araliphatic, aromatic and heterocyclic polyisocyanates described, for example, by W. Siefken in Justus Liebigs Annalen der Chemie, 362, pages 75 to 136. More specific examples include those corresponding to the formula Q(NCO)$_n$ wherein n=2–4, preferably 2 or 3, and Q represents an aliphatic hydrocarbon group having 2 to 18, preferably 6–10 carbon atoms; a cycloaliphatic hydrocarbon group having 4–15, preferably 5–10 carbon atoms; an aromatic hydrocarbon group having 6–15, preferably 6–13 carbon atoms; or an araliphatic hydrocarbon group having 8–15, preferably 8–13 carbon atoms; suitable polyisocyanates are also described in German Offenlegungsschrift No. 2,832,253, pages 10–11.

Commercially available polyisocyanates are in most cases particularly preferred. Such isocyanates include e.g. 2,4- and 2,6-tolylene diisocyanate and mixtures of these isomers ("TDI"); polyphenyl-polymethylene polyisocyanates obtainable by aniline/formaldehyde condensation followed by phosgenation ("crude MDI"); and polyisocyanates containing carbodiimide groups, urethane groups, allophanate groups, isocyanurate groups, urea groups or biuret groups ("modified polyisocyanates"), and in particular those modified polyisocyanates which are derived from 2,4- and/or 2,6-tolylene diisocyanate or from 4,4'- and/or 2,4'-diphenyl methane diisocyanate.

2. Compounds having at least 2 isocyanate reactive hydrogen atoms and having molecular weights from 400 to 10,000 are also used. These include not only compounds containing amino groups, thiol groups or carboxyl groups but particularly include compounds containing hydroxyl groups. Especially useful are those having 2 to 8 hydroxyl groups and especially those within the molecular weight range of from 1,000 to 6,000, preferably 2,000 to 6,000. Suitable hydroxy functional materials include polycarbonates, polyester amides and polyethers having at least 2, generally 2 to 8, preferably 2 to 6 hydroxyl groups, such as those known for the production of homogeneous and cellular polyurethanes and described, for example, in German Offenlegungsschrift No. 2,832,253, pages 11–18.

3. Compounds having at least 2 isocyanate reactive hydrogen atoms and a molecular weight of from 32 to 399 may optionally be used. These include compounds containing hydroxyl groups and/or amino groups and/or thiol groups and/or carboxyl groups. Preferred are compounds containing hydroxyl groups and/or amino groups, which compounds serve as chain lengthening agents or cross linking agents. These compounds generally have 2 to 8, and preferably 2 to 4 isocyanate reactive hydrogen atoms. Examples are described in German Offenlegungsschrift No. 2,832,253, pages 19–20.

4. Optional materials which can be used include
   (a) water and/or readily volatile organic substances as blowing agents,
   (b) catalysts of a known type used in quantities of up to 50% by weight, based on the quantity of the catalysts which are to be used according to the invention,
   (c) surface active additives such as emulsifiers and foam stabilizers,
   (d) reaction retarders (e.g. compounds which are acidic in reaction such as hydrochloric acid or organic acid halides), known cell regulators (such as paraffins or fatty alcohols or dimethyl polysiloxanes), pigments or dyes, flame retarders (e.g. trischloroethyl phosphate and tricresyl phosphate), stabilizers against ageing and weathering, plasticizers and fungistatic and bacteriostatic substances, as well as fillers (such as barium sulphate, kieselguhr, carbon black or whiting).

These auxiliary agents and additives which are optionally used have been described, for example, in German Pat. No. 2,732,292, pages 21 to 24.

Further examples of additives optionally used according to the invention, such as surface active additives, foam stabilizers, cell regulators, reaction retarders, stabilizers, flame retarding substances, plasticizers, dyes, fillers and fungistatic and bacteriostatic substances as well as details concerning their use and mode of action may be found in Kunststoff-Handbuch, Volume VII, published by Vieweg and Hochtlen, Carl-Hanser-Verlag, Munich 1966, e.g. on pages 103–113.

To produce the polyurethane composite materials and fabricated polyurethane products, the polyurethanes obtained are combined in a known manner with other materials.

The combination with the other material to form the composite material may, if desired, be carried out simultaneously with the preparation of the polyurethane, e.g. by a back filling technique, or it may be carried out after the polyurethane itself has been produced. The fabrication of the polyurethane product, e.g. the application of a covering of leather or textiles, is generally carried out by known methods after the polyurethane has been produced.

The following are mentioned as examples of the other materials used: polyvinylchloride in various color tones; polyvinyl acetate; ABS copolymers in various color tones; combinations of PVC and ABS; copolymers and homopolymers based on vinyl chloride, styrene, butadiene, isoprene, chloroprene, dichlorobutadiene, ethylene, propene, and acrylonitrile and their chlorination and chlorosulphonation derivatives; in the form of foils, coverings or edgings. The soft, semi-rigid or rigid polyurethane foams obtained with the aid of the catalysts according to the invention also prevent yellowing of textiles used as covering materials, e.g. cotton coverings, and light colored leather.

According to the invention, the components are reacted together by the known one-shot process, the prepolymer process or the semi-prepolymer process, in many cases using mechanical devices such as, for example, those described in U.S. Pat. No. 2,764,565. Details concerning the processing apparatus which may be used according to the invention are given in Kunststoff-Handbuch, Volume VII, published by Vieweg and Hochtlen, Carl-Hanser-Verlag, Munich 1966, e.g. on pages 121–205.

According to the invention, the production of foams is preferably carried out in closed molds. The reaction mixture is introduced into a mold, which may be made of a metal such as aluminum or a plastics material such as an epoxide resin. The reaction mixture foams up inside the mold to form the molded product. This foaming in the mold may be carried out to produce a molded part having a cellular structure on its surface or it may be carried out to produce a molded part having a compact skin and cellular core. According to the invention, the result desired may be achieved by either introducing just sufficient foamable reaction mixture into the mold to fill the mold with foam or introducing a larger quantity of foamable reaction mixture than is necessary for this purpose. The latter method is known as "overcharging". A procedure of this type has been disclosed, for example, in U.S. Pat. Nos. 3,178,490 and 3,182,104.

According to the invention, it is often preferred to produce foam products in molds which are either kept at a constant temperature or unheated (cold setting foams) (see British Pat. No. 1,162,517 and German Offenlegungsschrift No. 2,153,086).

In the preferred process of foaming in the mold, known "external mold release agents" such as silicone oils are frequently used. So-called "internal mold release agents" may also be used, optionally mixed with external mold release agents, e.g. the mold release agents described in German Offenlegungsschriften Nos. 2,121,670 and 2,307,589.

Foams may, of course, also be produced by block foaming or by the known laminator process.

The polyurethanes obtained according to the invention as products combined or fabricated with other materials may be used, for example, as dash-board panels, arm-rests, car roofs, domestic refrigerators, beds and seating furniture, mattresses, head-rests, and seats in transport vehicles such as cars, trains and aircraft.

The invention is further illustrated but is not intended to be limited by the following examples in which all parts and percentages are by weight unless otherwise specified.

EXAMPLES

EXAMPLES OF PRACTICAL APPLICATION AND COMPARISON

1. Synthesis of aminoalkanols

A. 117 ml of epichlorohydrin are added dropwise at room temperature to 621 g of a 48% aqueous dimethylamine solution at such a rate that the temperature is maintained at 45° to 50° C. The reaction mixture is then heated to 60° C. for 2 hours and to 100° C. for 1 hour. 165 g of a 45% sodium hydroxide solution are then introduced dropwise and the temperature is maintained at 100° C. for 1 hour. The reaction mixture is then cooled to 80° C. and 135 g of potash are added. The reaction product is separated at a temperature below 50° C. and dried over KOH. Bp: 78°–80° C. at 18 mbar, yield 190 g of

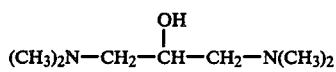

purity according to GC: 99.5%.

B. 117 ml of epichlorohydrin are added dropwise at room temperature to 510 g of diethylamine in 300 ml of water at such a rate that the temperature is maintained at 50° C. The reaction mixture is then heated to 60° C. for 2 hours and to 100° C. for 1 hour. 165 g of a 45% sodium hydroxide solution are added dropwise and the temperature is maintained for 1 hour. The reaction mixture is then cooled to 80° C. and 135 g of soda are added. The reaction product is separated at a temperature below 50° C. and dried over KOH.

Bp: 60° C. at 0.11 mbar, yield 199 g of

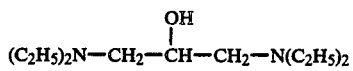

purity according to GC: 99.6%

C. 92.5 g of epichlorohydrin are added dropwise to a solution of 200 g of N-methyl piperazine in 100 ml of water at 50° C. The reaction mixture is then stirred at 60° C. for 2 hours and heated to 100° C. 140 g of a 45% sodium hydroxide solution are added and the temperature is maintained at 100° C. for 1 hour. The reaction mixture is then cooled to 80° C., 100 g of potash are added, and the reaction product is separated and dried over KOH.

Bp: 142°–147° C. at 0.2 mbar, yield 145 g of

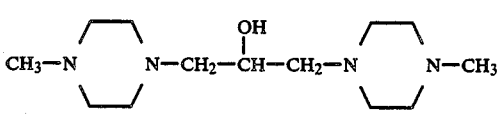

Purity according to GC: 99.9%

D. 92.5 g of epichlorohydrin are added dropwise to 174 g of morpholine in 200 ml of water at 50° C. and the reaction mixture is then stirred for 2 hours at 70° C. and heated to 100° C. 140 g of a 45% sodium hydroxide solution are then added dropwise and the temperature is maintained for 1 hour. 100 g of potash are then added at 80° C. and the reaction product is separated at 80° C. and dried over KOH.

Bp: 127° C. at 0.07 mbar, yield 165 g of

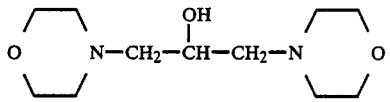

Purity according to GC: 99.5%.

2. Examination under practical conditions of use of PVC foils back foamed with semi-rigid polyurethane foams.

The following polyurethane raw materials were used for back foaming:

90 g of a polyether (molecular weight 4,800, obtained by the addition of propylene oxide (87%) and ethylene oxide (13%) to trimethylol propane), 2.5 g of water, 2 g of tall oil and 0.4 g of the activators indicated below were mixed with 47 g of a polyphenyl-polymethylene polyisocyanate which had been prepared by the phosgenation of an aniline/formaldehyde condensate and had an isocyanate content of 31% by weight, and the mixture was introduced into a mold.

Procedure

A commercial PVC foil about 0.7 mm in thickness which had not been colored was introduced into a metal plate mold measuring 20×20×4 cm which could be maintained at an adjusted temperature and the foil was back filled mechanically with the raw material mixture described above. The product was removed from the mold after a reaction and curing time of 5 minutes.

The molded products obtained were tempered separately at 120° C. in a circulating air drying cupboard, and the following results were obtained:

| Activators | 8 h Color change | 18 h at 120° C. |
|---|---|---|
| 1. diaza-bicyclo-2,2,2 octane | very severe discoloration | total discoloration |
| 2. 2,2'-dimethylamino- diethyl ether | reddish discoloration | very severe discoloration |
| 3. activator according to A | no discoloration | very slight discoloration |
| 4. activator according to C | no discoloration | very slight discoloration |
| 5. dimethylamino- propyl formamide | medium discoloration | very severe discoloration |
| PVC foil, colorless, (comparison test) | no discoloration | slight discoloration |

Clear evidence is thus obtained that contact discoloration is prevented by using semi-rigid foams which are activated with the amino alkanols according to the invention.

In the case of colored foils, the color changes become visible only after considerably longer periods of time.

When analogous back foaming is carried out on a blue colored PVC foil 0.7 mm in thickness used for car fittings, the following results are obtained when the tempering is at 120° C.

| Activators | 72 h | 168 h | 288 h | 336 h | 505 h |
|---|---|---|---|---|---|
| 1. diaza-bicyclo- 2,2,2-octane | black | black | black | black | black |
| 2. 2,2'-dimethyl- aminodiethyl ether | bluish black | bluish black | black | black | black |
| 3. activator according to A | blue | blue | blue | blue | predominantly blue |
| 4. activator | blue | blue | blue | blue | predom- |

| Activators | 72 h | 168 h | 288 h | 336 h | 505 h |
|---|---|---|---|---|---|
| according to C | | | | | inantly blue |
| 5. dimethylamino-propyl formamide | bluish black | black | black | black | black |
| blue PVC foil, (comparison test) | blue | * | | | |

*From this time onwards, the foil becomes covered with silver colored patches but the basic blue color is preserved. This phenomenon does not occur with the activators according to the invention.

In the blue colored back foamed PVC foil, the aminoalkanols A and C according to the invention also prevent contact discoloration of the foil which would otherwise occur, as well as producing an additional stabilizing effect.

The effects described occur even at low temperatures. It is for this reason that edgings around refrigerator doors, which are made for the most part of PVC, are frequently colored to avoid the difficulty of any contact discoloration.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of optionally foamed polyurethanes which are combined or fabricated with another material comprising reacting compounds with molecular weights from 400 to 10,000 containing at least 2 isocyanate reactive hydrogen atoms with polyisocyanates in the presence of catalysts containing tertiary amino groups and combining or fabricating the resulting polyurethane with another material, characterized in that the catalysts used are diffusion resistant amino-alkanols corresponding to the general formula

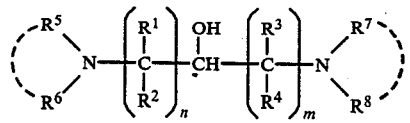

wherein
R$^1$, R$^2$, R$^3$ and R$^4$ may be identical or different and represent hydrogen or a C$_1$-C$_6$ alkyl group,
R$^5$, R$^6$, R$^7$ and R$^8$ may be identical or different and represent a C$_1$-C$_6$ alkyl group or together from a C$_2$-C$_6$ alkylene group which may contain hetero atoms such as O or NR (R=C$_1$-C$_4$ alkyl), and n and m may be identical or different and represent integers from 1 to 6.

2. The process of claim 1, characterized in that said other material is in the form of a foil, covering or edging and is selected from the group consisting of PVC; ABS; mixtures of PVC and ABS; polyvinyl acetate; polyvinyl butyral; copolymers or homopolymers of vinyl chloride, styrene, butadiene, isoprene, chloroprene, dichlorobutadiene, ethylene, propene or acrylonitrile or their chlorination or chlorosulphonation derivatives; and textiles based on cotton, or leather.

3. The process of claim 2, characterized in that the catalysts used are compounds corresponding to the formula

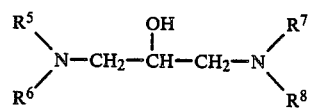

wherein R$^5$, R$^6$, R$^7$ and R$^8$ represent methyl or ethyl.

4. The process of claim 2, characterized in that the catalyst used is the compound corresponding to the formula

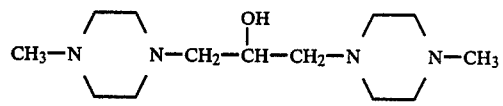

5. The process of claim 2, characterized in that the catalyst used is the compound corresponding to the formula

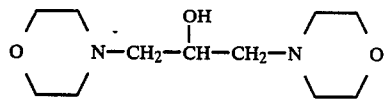

6. The process of claim 2, characterized in that the catalyst use is the compound corresponding to the formula

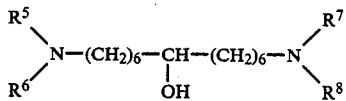

wherein R$^5$, R$^6$, R$^7$ and R$^8$ represent methyl or ethyl.

* * * * *